US010755851B2

(12) United States Patent
Roy et al.

(10) Patent No.: US 10,755,851 B2
(45) Date of Patent: Aug. 25, 2020

(54) DRY TYPE CAST TRANSFORMER WITH FLEXIBLE CONNECTION TERMINAL

(71) Applicant: ABB Power Grids Switzerland AG, Baden (CH)

(72) Inventors: Carlos Roy, Saragossa (ES); Rafael Murillo, Saragossa (ES); Antonio Nogues, Sarinena Huesca (ES); Lorena Cebrian, Saragossa (ES); Luis Sanchez, Vigo (ES); Rahul Shah, Gujarat (IN)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 15/958,302

(22) Filed: Apr. 20, 2018

(65) Prior Publication Data

US 2018/0247757 A1 Aug. 30, 2018

Related U.S. Application Data

(63) Continuation of application No. PCT/EP2016/074037, filed on Oct. 7, 2016.

(30) Foreign Application Priority Data

Oct. 20, 2015 (IN) .......................... 5649/CHE/2015
Dec. 2, 2015 (EP) .................................... 15197556

(51) Int. Cl.
*H01F 27/29* (2006.01)
*H01F 27/32* (2006.01)
(Continued)

(52) U.S. Cl.
CPC ........... *H01F 27/327* (2013.01); *H01F 27/29* (2013.01); *H01F 27/32* (2013.01); *H01F 41/005* (2013.01);
(Continued)

(58) Field of Classification Search
CPC .......... H01F 5/04; H01F 27/327; H01F 27/29; H01F 27/04; H01F 27/324; H01F 2027/328
(Continued)

(56) References Cited

U.S. PATENT DOCUMENTS 2,421,444 A * 6/1947 Tyne ......................... H01F 5/06 174/77 R
3,059,044 A * 10/1962 Friedrich ............... H01H 33/56 174/18
(Continued)

FOREIGN PATENT DOCUMENTS

AU 521297 B2 3/1982
EP 2075806 A1 7/2009
(Continued)

OTHER PUBLICATIONS

European Patent Office, International Search Report & Written Opinion issued in corresponding Application No. PCT/EP2016/074037, dated Jan. 30, 2017, 14 pp.
(Continued)

*Primary Examiner* — Mang Tin Bik Lian
(74) *Attorney, Agent, or Firm* — Sage Patent Group

(57) ABSTRACT

A dry type cast-coil transformer having a voltage rating of 1 Kv and above, including: at least one coil with a plurality of conductor turns; a cast comprising a polymeric resin, encompassing the coil and having a cast surface; a ferromagnetic core on which the coil with the encompassing cast is mounted; an insulated cable termination connected to the coil, wherein the connection point between the insulated cable termination and the coil is within the cast, and wherein a flexible portion of the insulated cable termination further extends from the cast surface outwards and comprises a plurality of metal wires.

23 Claims, 6 Drawing Sheets

(51) Int. Cl.
*H01F 41/12* (2006.01)
*H01F 41/00* (2006.01)

(52) U.S. Cl.
CPC ..... *H01F 41/127* (2013.01); *H01F 2027/328* (2013.01)

(58) Field of Classification Search
USPC ........................................ 336/5, 90, 150, 192
See application file for complete search history.

(56) References Cited

U.S. PATENT DOCUMENTS

| | | | | | |
|---|---|---|---|---|---|
| 3,071,672 | A * | 1/1963 | Mitchell | H01H 33/02 | 218/91 |
| 3,240,848 | A * | 3/1966 | Burke | H01F 27/022 | 174/521 |
| 3,333,221 | A * | 7/1967 | Lockie | H01F 27/402 | 336/179 |
| 3,474,369 | A * | 10/1969 | Keogh | H01F 27/002 | 336/65 |
| 3,569,884 | A * | 3/1971 | Wright | H01F 27/022 | 336/192 |
| 3,735,019 | A * | 5/1973 | Hess | H01B 17/32 | 174/31 R |
| 4,459,575 | A * | 7/1984 | Geissler | H01F 27/08 | 336/192 |
| 4,521,954 | A | 6/1985 | Rademaker et al. | | |
| 6,678,139 | B1 * | 1/2004 | Greuter | H02G 15/06 | 361/117 |
| 9,640,314 | B2 * | 5/2017 | Singh | H01F 27/23 | |
| 2009/0284338 | A1 * | 11/2009 | Maruyama | H01F 41/069 | 336/182 |
| 2015/0349507 | A1 * | 12/2015 | Mauri Lopez | H02B 1/52 | 174/520 |

FOREIGN PATENT DOCUMENTS

| | | | |
|---|---|---|---|
| EP | 2717280 | A1 | 4/2014 |
| EP | 2797088 | A1 | 10/2014 |
| GB | 1602970 | A | 11/1981 |
| JP | 2009277914 | A | 11/2009 |
| KR | 20030012395 | A | 2/2003 |
| KR | 100823228 | B1 | 4/2008 |
| KR | 20130098857 | A | 9/2013 |

OTHER PUBLICATIONS

European Patent Office, International Preliminary Report on Patentability issued in corresponding Application No. PCT/EP2016/074037, dated Dec. 15, 2017, 16 pp.

European Patent Office, Extended Search Report issued in corresponding Application No. 15197556.2, dated Jun. 3, 2016, 9 pp.

Office Action issued in corresponding Korean application No. 10-2018-7014236, dated Jun. 21, 2018, 4 pp.

Decision for Grant of Patent issued in corresponding Korean application No. 10-2018-7014236, dated Sep. 6, 2018, 3 pp.

* cited by examiner

DRY TYPE CAST TRANSFORMER WITH FLEXIBLE CONNECTION TERMINAL

TECHNICAL FIELD

This disclosure relates to the field of electrical transformers, particularly to medium and high voltage transformers of the dry-cast type having electrical connection terminals with improved connection terminals.

BACKGROUND OF THE INVENTION

As the insulation level of a transformer increases, the insulation arrangement of its high voltage terminals gains importance. The matter is not only the insulation between the terminals and earth, but also between any pair of terminals in the same winding. This mainly applies to the lightning impulse withstand voltage, although the power frequency withstand voltage also plays a role. The problem of the insulation can be viewed in two ways:

On one hand, the higher the voltage, the more difficult it is also to provide sufficient insulation against earth and between terminals in the same winding. Also, the smaller the dimensions, the more difficult the insulation is between terminals in the same winding. The inclusion of barriers around a terminal or the covering of its surface with solid insulation increases the electric field (and so the voltage) it can support without having any discharge. The effect of the barriers can be explained with their property of stopping free charges which can initiate a discharge, while the effect of the solid insulation can be explained with its lower electron emissivity compared with a metal. Apart from that, in both cases the creepage distance is increased, thus contributing to a greater withstand voltage.

Regarding HV terminals for cast-coil dry-type transformers, the following types are usually applied. The terminals for the lines connection often consist of bared bolts, which can be placed at the top and bottom edges of the phase. Usually, the terminals have no special insulation, or they may have grooves in order to increase the creepage distance against earth potential or other live points in the same winding. Further, smooth bushings may be applied, which increase the creepage distance. Known are also bushings that are equipped with additional sheds, e.g. for high levels of pollution or even for outdoor installation. In the case of tap-changer terminals, consisting of groups of bared bolts placed in the middle of the winding, there is typically no special insulation applied around them. However, also in this case, protrusions, grooves, or even bushings may be applied.

When a series connection is applied to connect windings, e.g. when there is more than one winding in the same magnetic core leg, the same arrangements as for the tap-changer terminals can be used for interconnecting the windings to each other.

Particularly at high voltages or difficult environmental conditions, the known techniques may suffer from various isolation issues. Further, if such issues are addressed by employing bushings or the like, enhanced production cost will result and enhanced risk of damage can result, e.g. during transportation of the transformer.

U.S. Pat. No. 3,569,884 discloses transformer coils wound from sheet conductor and cast together with their high-voltage lead conductors in a resin housing. The high-voltage lead conductors are braced against the low voltage windings. This allows to reduce the possibility that stresses are applied to the housing through the rigid high-voltage lead conductors. GB 1 602 970 and AU 521 297 alike disclose transformer coils wound from sheet conductor and cast together with their rigid high-voltage leads in a resin housing. US 2009/0284338 discloses a transformer with a multi-stage coil made of flat rectangular wires. In view of the above, there is a need for the present invention.

SUMMARY OF THE INVENTION

This objective is achieved by the subject-matter of the independent claims. Embodiments are given by dependent claims and claim combinations, and by the description in connection with the drawings. In a first aspect, a dry type cast-coil transformer having a voltage rating of 1 kV and above, comprising at least one coil with a number of conductor turns; a cast comprising a polymeric resin, encompassing the coil and having a cast surface; a ferromagnetic core on which the coil with the encompassing cast is mounted; and an insulated cable termination connected to the coil, wherein the connection point between the insulated cable termination and the coil is within the cast, and wherein a flexible portion of the insulated cable termination further extends from the cast surface outwards.

In a further aspect, a method of producing a dry cast transformer for voltage ratings above 1 kV is provided, comprising: providing a coil; providing at least one cable being at least partially flexible, and connecting it to the coil to form an insulated cable termination; providing a cast of polymeric resin in a casting process employing a mold to encompass the winding in the cast, wherein the casting process is adapted such that the connection point between the first insulated cable termination and the coil is within the cast, and wherein a flexible portion of the first insulated cable termination further extends from the cast surface outwards, in particular wherein a flexible portion of the first insulated cable termination immediately extends from the cast surface outwards.

Further aspects, advantages and features of the present invention are apparent from the dependent claims, the description and the accompanying drawings.

BRIEF DESCRIPTION OF THE DRAWINGS

A full and enabling disclosure, including the best mode thereof, to one of ordinary skill in the art is set forth more particularly in the remainder of the specification, including reference to the accompanying figures, wherein.

DETAILED DESCRIPTION OF THE INVENTION

Figure 1:
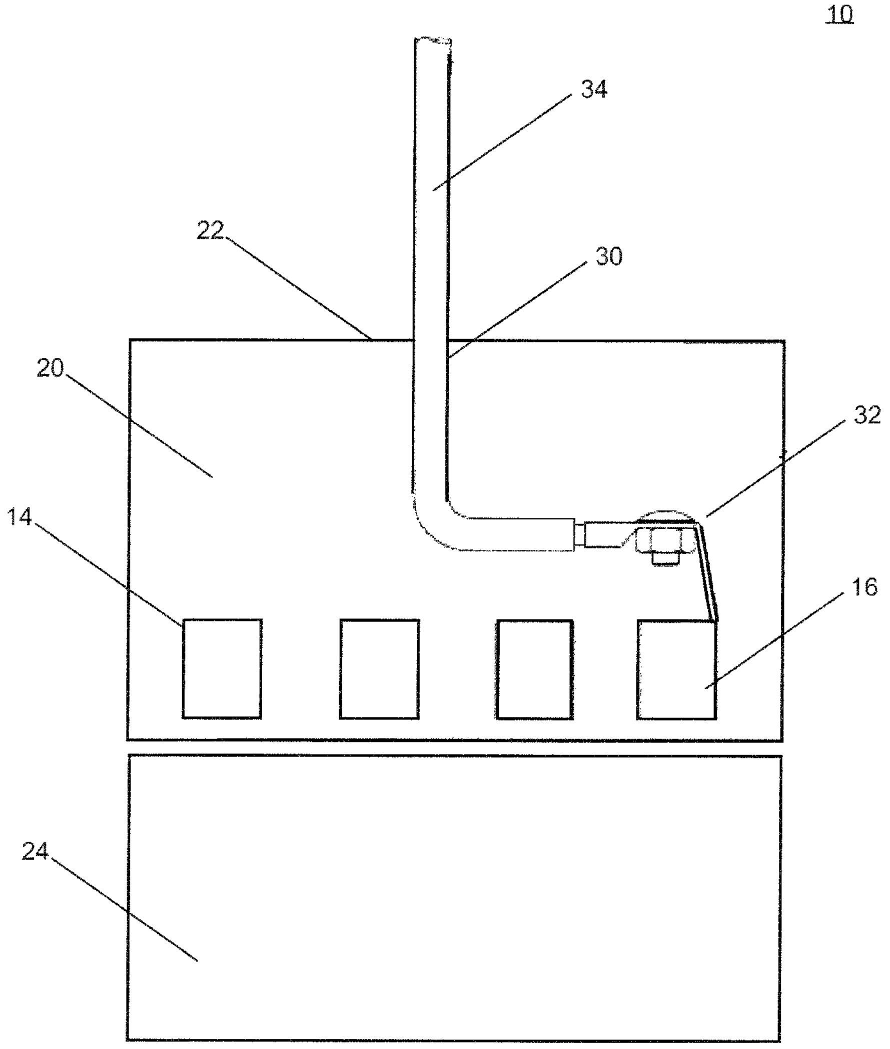
FIG. 1 schematically shows a cross-sectional view of a transformer according to embodiments, FIG. 2 schematically shows a cross-sectional view of a further transformer according to embodiments.

Reference will now be made in detail to various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Within the following description of the drawings, the same reference numbers refer to the same components. Generally, only the differences with respect to the individual embodiments are described. When several identical items or parts appear in a figure, not all of the parts have reference numerals in order to simplify the appearance.

The systems and methods described herein are not limited to the specific embodiments described, but rather components of the systems and/or steps of the methods may be utilized independently and separately from other components and/or steps described herein. Rather, the exemplary embodiment can be implemented and used in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

In FIG. 1, a dry-type cast-coil transformer 10 according to embodiments is shown. The transformer 10 comprises at least one coil 14. The coil has a plurality of conductor turns 16. The conductor turns are typically made of metal, e.g. copper or aluminum, also other conducting materials might be employed. A cast 20 comprising a polymeric resin, typically epoxy resin, is encompassing the coil 14. The cast 20 has a cast surface 22. This coil which is encompassed in the cast is mounted on a ferromagnetic core 24, wherein the latter is only shown schematically in the accompanying drawings. Such dry-type cast-coil transformers 10 are construed for voltages on the HV side from about 1 kV to about 123 kV or 145 kV, more typically from about 10 kV to about 72 kV. Generally, the dry-type transformers according to the embodiments have power ratings of 10 kVA or greater, more typically 1 MVA or greater, up to 63 MVA.

According to embodiments, at least one insulated cable termination 30 is connected to the coil 14. Thereby, the connection point 32 between the insulated cable termination 30 and the coil 14 is within the resin body of the cast 20. A flexible portion 34 of the insulated cable termination 30 further extends from the cast surface 22 outwards—wherein typically, the insulated cable termination 30 is flexible over its entire length from the connection point 32 to the end of the flexible portion 34. In other words, a first part of the insulated cable termination 30 extends from the connection point 32 through a portion of the cast 20 to the cast surface 22, and a second, flexible part of the insulated cable termination 30 further extends from the cast surface 22 outwards. The second part, which forms the flexible portion 34 of the insulated cable termination 30, thereby forms a flexible terminal connection with the coil 14. The flexible portion 34 protrudes out of the cast surface 22. The cable 31 used for producing the insulated cable termination 30 has typically an insulation with a plastic layer or sheath over its entire length. Thus, the flexible portion 34 protrudes out of the cast surface 22 having an insulation, such that there is a gapless insulation extending from the cast surface over the flexible portion 34. Thus, the insulation is flexible and maintains the flexibility of the cable 31 and thus of the flexible portion 34 outside the cast surface 22. This insulation is proof with respect to protection against, e.g., elevated levels of ambient moisture or increased air pollution. Generally, with embodiments described herein, the insulation and the creepage distance between the terminals, and between terminals and the cast surface are increased. This allows to avoid the use of unpractical large clearances, and generally increases the lightning impulse withstand voltage and also the power frequency withstand voltage. Further, the flexible portion 34 reduces risk of damage of terminals, as it just bends when accidentally stressed, e.g. during transport.

The connection point 32 between the insulated cable termination 30 and the coil 14 is within the resin body of the cast 20. As shown in FIG. 1, the connection between the insulated cable termination 30 and the coil 14 may typically be carried out in the form of a screw-type terminal. The connection at connection point 32 may also be carried out differently, e.g. welded, crimped, or soldered.

At the end of the flexible portion 34, there is in practical use typically a blank metallic portion or a termination (not shown in FIG. 1, see FIG. 3) for a connection to other components. The flexible portion 34 is not particularly limited in its length. It may have a length from a few centimeters, e.g. 10 cm, allowing a connection to other parts, up to several meters, e.g. 1 m, 2 m, 5 m, or 10 m.

This kind of insulated cable termination, which provides a flexible terminal connection, may be used, e.g., for a direct connection of the transformer 10 with another electrical component, such as a support insulator, a circuit breaker, an on-load tap-changer, etc., without breaking the insulation. In general, the most stressed terminals are the beginning and end of each phase, and so the greatest benefit is expected when these are provided such as described above; although also any intermediate terminals may so be provided, e.g. for a series connection or for the plurality of connections to a tap-changer.

Figure 2:
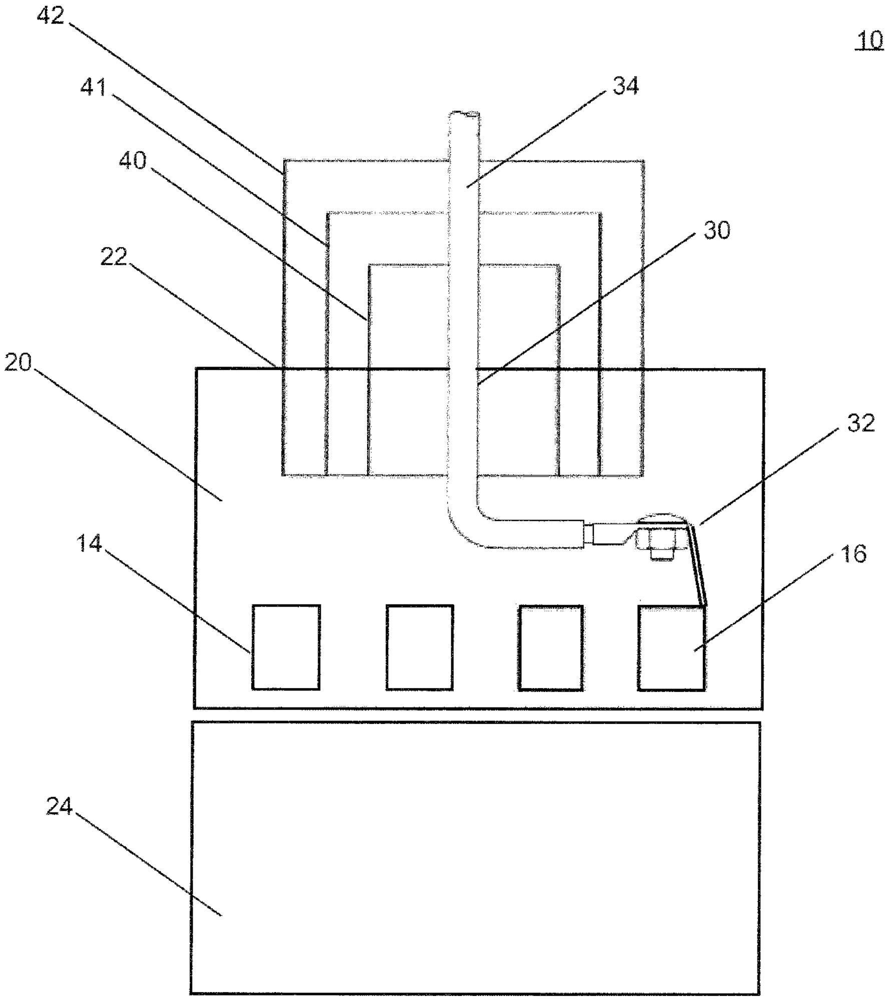

In FIG. 2, for further enhancing protection against creepage, the similar transformer 10 as in FIG. 1 is shown, which has three additional cylindrical insulation screens 40, 41, 42. These further increase insulation properties and increase creepage distance(s) between the flexible portion 34 and other insulated cable terminations (not shown) positioned adjacent to the insulated cable termination 30 shown in FIG. 2. The cylindrical insulation screens 40, 41, 42 are typically placed prior to the casting process of the coil 14 and form an integral part with the cast after the casting is finished. The creepage distance along the external epoxy surface is thereby further increased. The shape, material, number, thickness and lengths of the screens depends on the required insulation. As a non-limiting example, up to three glass-fibre cylindrical insulation screens 40, 41, 42 with a wall thickness of about 3 mm to 6 mm each, and a length between 100 mm to 300 mm (in a direction perpendicular to the cast surface 22) may be suitable.

Figure 3:
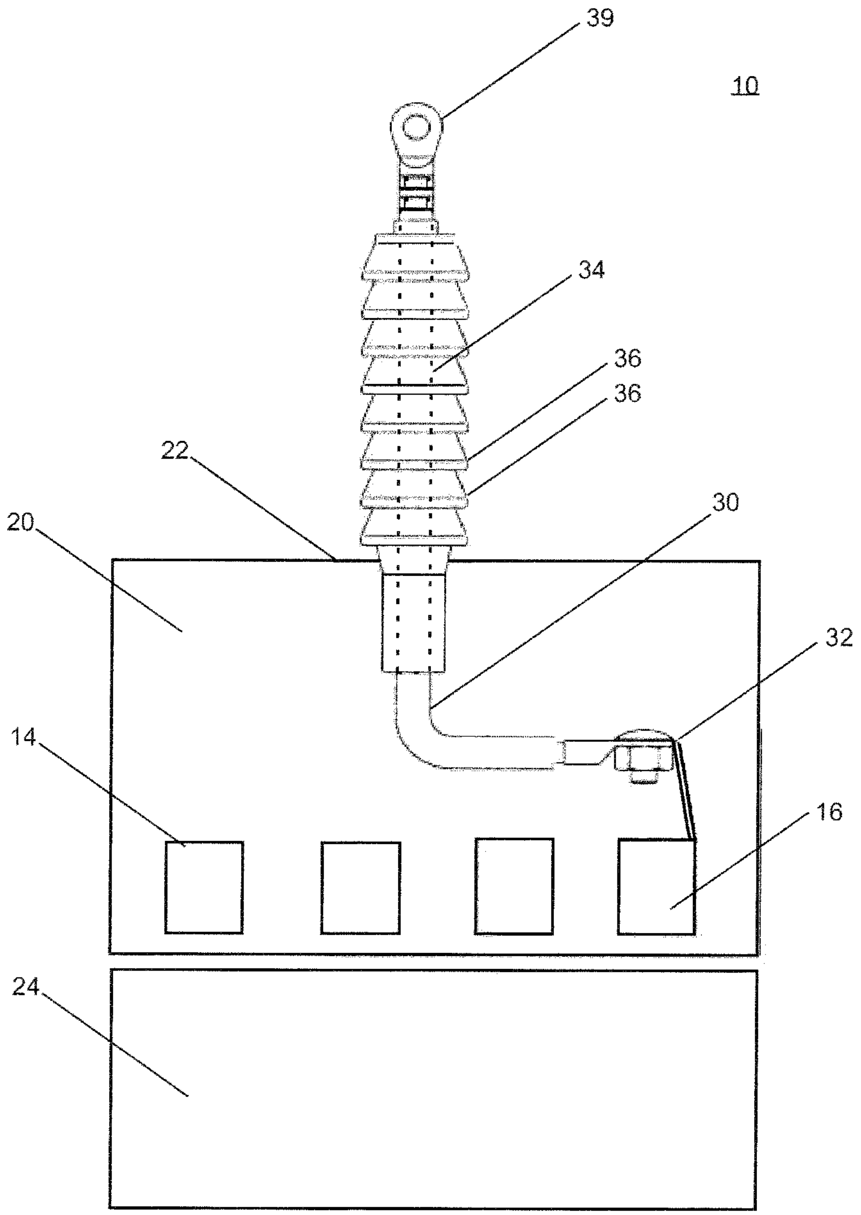
FIG. 3 schematically shows a cross-sectional view of a transformer according to further embodiments.

In FIG. 3, a transformer according to embodiments is shown, further comprising a plurality of sheds 36 provided around the flexible portion 34 of the insulated cable termination 30. That is, the sheds 36 are provided for at least a part of the length of the flexible portion 34 outwards from the cast surface 22. In this case, the insulated cable termination 30 is used to provide a flexible, but stable terminal at the transformer itself. The length of the termination and the number and type of its sheds depends on the required insulation. As in the previous case, the insulated cable and its termination 39 are typically arranged prior to the casting process forming the cast 20 around the coil 14.

The conductor turns 16 (shown only in reduced number in the drawings) of the coil 14 typically or preferably comprise or consist of a solid metallic material, in particular comprise of consist of a single wound metal wire of, e.g., Copper (Cu)

or Aluminium (Al), with an insulation. In particular, the flexible portion (34) of the insulated cable termination (30) immediately extends from the cast surface (22) outwards. The cable of the insulated terminal connection 30, at least the flexible portion 34 thereof, typically comprises a plurality of metal wires 35 in order to ensure the desired flexibility. In other words, it typically comprises litz wire or braided/stranded wire. In particular, a conductive part of the flexible portion 34 of the insulated cable termination 30 consists of the plurality of metal wires or litz wires or braided wires or stranded wires 35.

The conductor turns 16 of the coil 14 typically have a cross section of at least 10 $mm^2$, and the insulated cable termination 30 also has a cross section of at least 10 $mm^2$.

Figure 4:
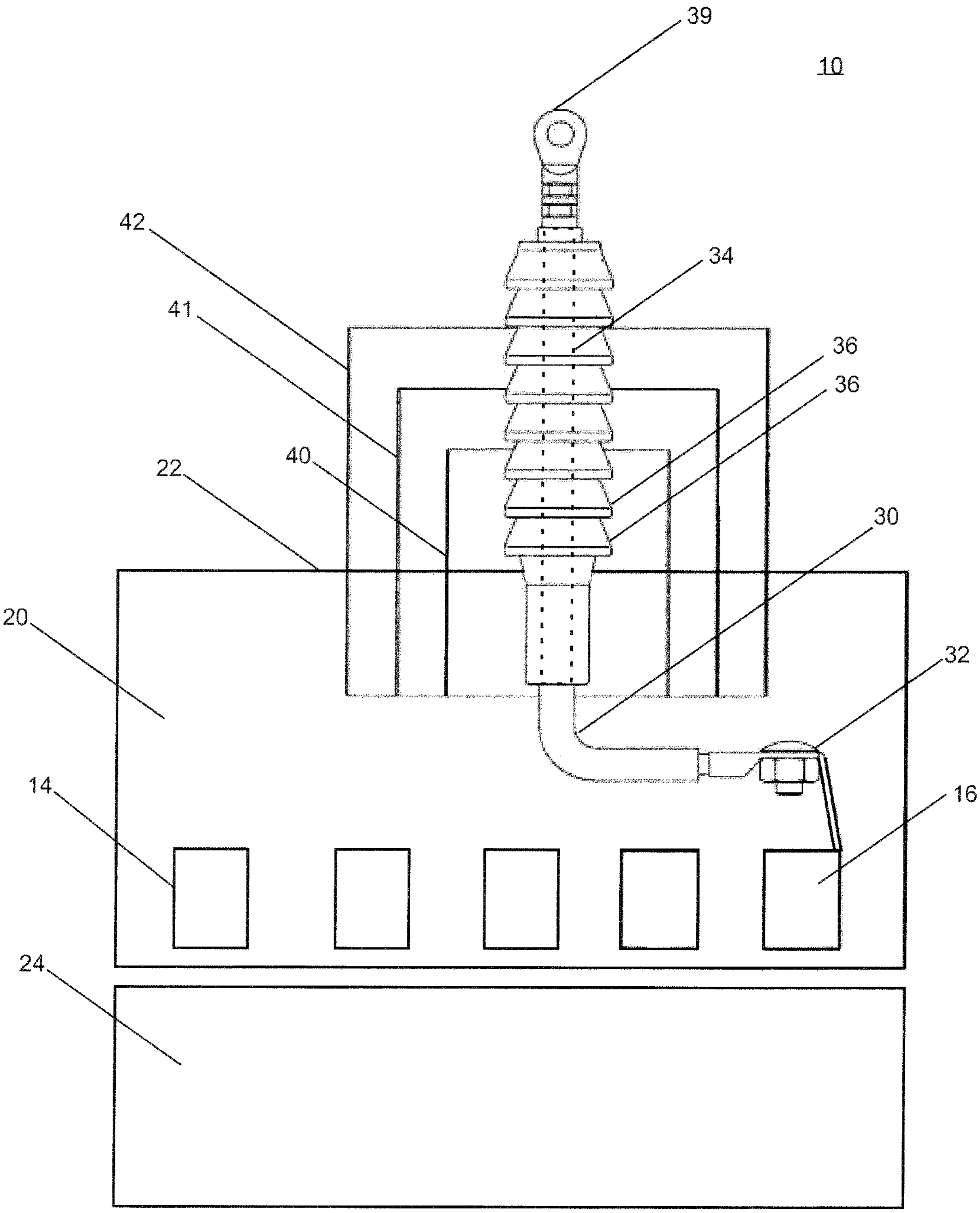
FIG. 4 schematically shows a cross-sectional view of a transformer according to embodiments.

In FIG. 4, a transformer according to embodiments is shown, wherein the arrangement of FIG. 3, comprising a plurality of sheds 36, is combined with the cylindrical insulation screens 40, 41, 42 as shown in FIG. 2. In this embodiment, the creepage distance is further increased by combining the effects of both the sheds 36 and the cylindrical insulation screens 40, 41, 42.

It is understood that the transformer 10 described with respect to the drawings is just exemplary. Typically, it may have at least one further insulated cable termination 30 as described, such that at least the high voltage coil (or high voltage winding) is fully equipped with is. Also, typically all terminals of a transformer, including high voltage side and low voltage side, may be equipped with such insulated cable terminations.

Further, it goes without saying that the transformer may be a three-phase-transformer. Thus, it may comprise at least three coils 14, or greater numbers like six or nine coils 14. Thereby, one, two or three coils 14 each may be encompassed in an individual cast 20.

The transformer 10 may also comprise a tap changing mechanism 38 provided outwards from the coils 14, wherein at least a part of the plurality of insulated cable terminations 30 is connected to the tap changing mechanism 38.

For producing a transformer 10 as described, a method according to embodiments is provided. It comprises producing and providing a coil 14 having a plurality of conductor turns 16. At least one cable 31 is provided being at least partially flexible, and is connected to the coil 14, such that the cable 31 forms an insulated cable termination 30 for the coil 14. Then, a cast 20 of polymeric resin is produced in a casting process employing a mold 21 to encompass the coil in the cast 20.

Figure 5:
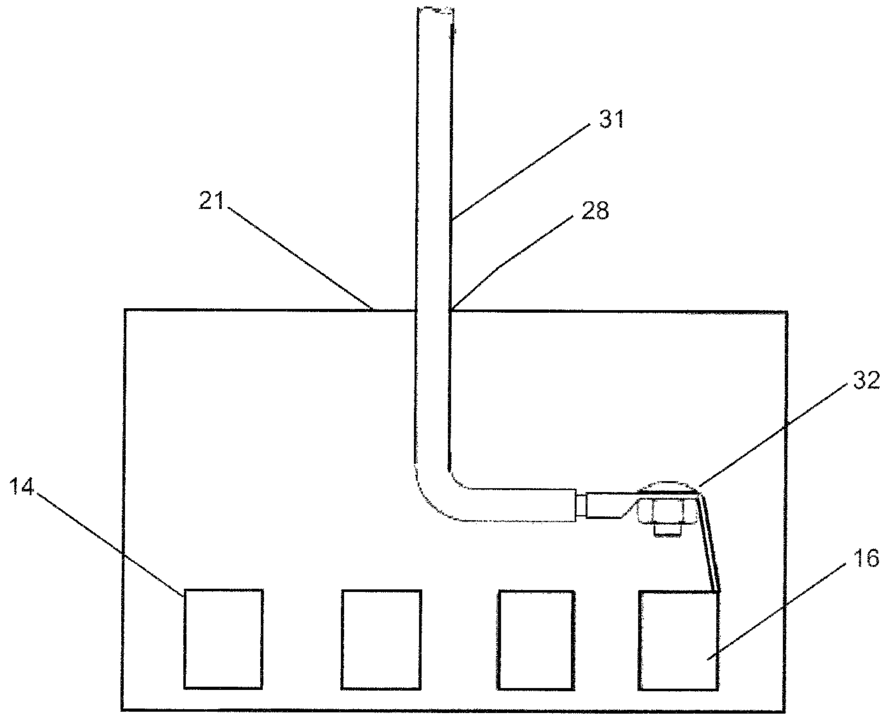
FIG. 5 schematically shows a mold employed in a casting process of a method according to embodiments.
Figure 6:
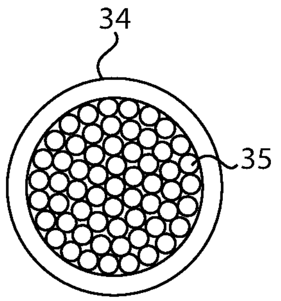
FIG. 6 schematically shows a plurality of metal wires of the flexible portion of the insulated cable termination.
Figure 7:
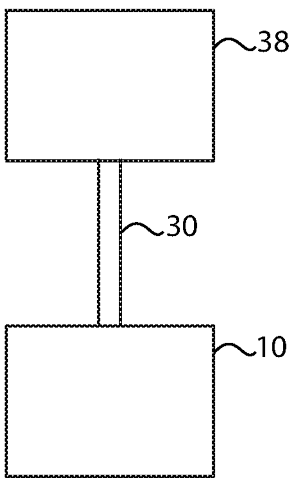
FIG. 7 schematically shows a tap changing mechanism connected to the insulated cable termination.

In FIG. 5, the mold 21 is shown in which the coil 14 is provided for the casting process according to a method of embodiments. The cable 31, which will form the insulated cable termination 30 after the casting, is provided to be connected to the coil 14 at connection point 32, typically with a screw-type terminal. The connection at connection point 32 may also be carried out differently, e.g. welded, crimped, or soldered.

Cable 31 is provided to extend through the recess 28 in the mold 21, at which position it will extend from the cast 20 as the flexible portion 34, after the casting process is finished. After the casting process is finished, cable 31 forms the insulated cable termination 30.

Thereby, the casting process is adapted such that the connection point 32 between the insulated cable termination 30 and the coil 14 is within the cast 20. Further, it is provided that a flexible portion of the insulated cable termination 30 extends from the cast surface 22 outwards. The mold 21 typically has at least one recess 28 through which the cable 31 is placed prior to the casting process.

Thereby, the conductor turns 16 of the coil 14 typically comprise or consists of a solid metallic material with an insulation between the conductor turns 16, and at least the flexible portion of the insulated cable termination 30 comprises a plurality of metal wires, thus, it typically comprises litz wire or braided/stranded wire.

In embodiments, a plurality of sheds 36 is provided around the flexible portion 34 of the insulated cable terminal 30 for at least a part of its length which extends outwards from the cast surface 22. These may typically be provided prior to the casting process or afterwards, depending on, for example, if the flexible portion 34 has a termination 39 (see FIG. 4) which might hinder their mounting after the casting process is finished.

The cable 31 may be provided prior to the casting to have a spiral form on at least a part of its length between the connection point 32 to the coil 14 and the position at which the cable passes the cast surface 22 after the casting process is finished.

Generally, with embodiments described herein, the insulation and the creepage distance are increased, avoiding the use of unpractical big clearances. This is particularly useful for terminals with higher electrical stress, e.g. the line terminals, and also where there is a high concentration of terminals in a reduced area, e.g. at the tap-changer.

Furthermore, the use of an insulated terminal connection in the series connection between windings, or in the connection between phases (delta or wye), also results in an increase of the insulation and the creepage distance.

Furthermore, the shape of the terminals is improved from the point of view of the electrical stress. While in the standard solution, rectangular-shaped bars and cable lugs are used, with the insulated cable only cylindrical elements are used. Hence, the electrical stress is smoother than in the standard case.

The internal arrangement and the physical links with the coil are also improved, as the required space is reduced. The reason for this is, that the cable of the insulated terminal connection has a circular cross-section, and the fact that it is already insulated. This is useful in particular for the tap-changer.

The manufacturing process, just by connecting the cable to the coil conductor prior to casting, is simpler than the known alternatives in the prior art—which often involve the use of additional casting molds in order to manufacture resin bushings around the terminals.

As the insulated cable extending from the cast surface is flexible, it is not possible to break it during handling or transport. This is an advantage over bushings made of epoxy, which are quite brittle and thus may be easily broken or generally damaged.

Embodiments can be applied in transformers with a high insulation level or in transformers with reduced dimensions between terminals, which makes insulation difficult in general.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art.

Such other examples are intended to be within the scope of the claims if they have structural elements that do not differ from the literal language of the claims, or if they include equivalent structural elements with insubstantial differences from the literal language of the claims.

The invention claimed is:

1. A dry type cast-coil transformer having a voltage rating of 1 kV and above, comprising:

at least one coil with a plurality of conductor turns;

a cast comprising a polymeric resin, encompassing the coil and having a cast surface;

a ferromagnetic core on which the coil with the encompassing cast is mounted;

an insulated cable termination connected to the coil, wherein a connection point between the insulated cable termination and the coil is within the cast, and wherein a first part of the insulated cable termination extends from the connection point through a portion of the cast to the cast surface, a second part of the insulated cable termination forms a flexible portion of the insulated cable termination which further extends from the cast surface outwards, wherein the insulated cable termination comprises a plurality of sheds provided around the flexible portion of the insulated cable termination for at least a part of a length of the insulated cable termination outwards from the cast surface, and wherein the flexible portion and the plurality of sheds provided around the flexible portion form a flexible section extending from the cast surface outward.

2. The transformer of claim 1, further comprising at least one cylindrical insulation screen provided around the flexible portion of the insulated cable termination, the cylindrical insulation screen being in physical contact with the cast surface.

3. The transformer of claim 2, wherein the at least one cylindrical insulation screen provided around the flexible portion of the insulated cable termination is comprised of a material different than the polymeric resin of the cast.

4. The transformer of claim 1, wherein the conductor turns of the coil comprise or consist of a solid metallic material with an insulation.

5. The transformer of claim 4, wherein each of the conductor turns comprises a single metal wire with an insulation.

6. The transformer of claim 5, wherein the single metal wire is made of Copper or Aluminium.

7. The transformer of claim 1, wherein the conductor turns of the coil have a cross section of at least 10 mm2, and the insulated cable termination has a cross section of at least 10 mm2.

8. The transformer of claim 1, wherein the transformer is a three-phase-transformer, and the transformer having three to six coils, wherein one or two coils each are encompassed in an individual cast.

9. The transformer of claim 8, wherein the transformer includes a plurality of insulated cable terminations connected to the coils at positions within the casts and extending flexibly from the cast surfaces outwards.

10. The transformer of claim 9, further comprising a tap changing mechanism provided outwards from the coils, wherein at least a part of the plurality of insulated cable terminations being connected to the tap changing mechanism.

11. The transformer of claim 1, wherein the insulated cable termination comprises the plurality of metal wires in order to ensure the desired flexibility of the flexible portion.

12. The transformer of claim 11, wherein the insulated cable termination comprises litz wire or braided wire or stranded wire.

13. The transformer of claim 1, wherein the flexible portion of the insulated cable termination immediately extends from the cast surface outwards, and/or that a conductive part of the flexible portion of the insulated cable termination consists of the plurality of metal wires.

14. A method of producing a dry type cast-coil transformer according to claim 1, comprising:

a) Providing a coil having a plurality of conductor turns;

b) Providing at least one cable being at least partially flexible, and connecting the at least one cable to the coil to form an insulated cable termination;

c) Providing a cast of polymeric resin in a casting process employing a mold to encompass the coil in the cast, wherein the casting process is adapted such that a connection point between the insulated cable termination and the coil is within the cast, and a flexible portion of the insulated cable termination further extends from the cast surface outwards, wherein the method further including: providing a plurality of sheds around the flexible portion of the insulated cable terminal for at least a part of a length of the insulated cable terminal to which the insulated cable terminal extends outwards from the cast surface, wherein the flexible portion and the plurality of sheds therearound form a flexible section extending from the cast surface outward.

15. The method of claim 14, wherein the mold has at least one recess through which the cable is placed for the casting process.

16. The method of claim 14, wherein the conductor turns of the coil comprise or consist of a solid metallic material with an insulation.

17. The method of claim 14, wherein the cable is provided to have a spiral form on at least a part of a length of the cable between the connection point to the coil and the position, at which the cable passes the cast surface after the casting process is finished.

18. The method of claim 14, further comprising: providing at least one cylindrical insulating screen around the insulated cable termination, in contact with the cast surface, the cylindrical insulating screen preferably comprising a polymeric resin.

19. The method of claim 14, wherein the conductor turns of the coil have a cross section of at least 10 mm2, and the insulated cable termination has a cross section of at least 10 mm2.

20. The transformer of claim 1, wherein the insulated cable termination forms a flexible terminal connection at the transformer.

21. The transformer of claim 1, wherein the plurality of sheds are provided around the flexible portion of the insulated cable termination either prior to or after forming the cast by a casting process.

22. The transformer of claim 1, wherein an insulation of insulated cable termination comprises one of a plastic layer or a plastic sheath over both the first part and the second part of the insulated cable termination.

23. A dry type cast-coil transformer having a voltage rating of 1 kV and above, comprising:

at least one coil with a plurality of conductor turns;

a cast comprising a polymeric resin, encompassing the coil and having a cast surface;

a ferromagnetic core on which the coil with the encompassing cast is mounted;

an insulated cable termination connected to the coil, wherein a connection point between the insulated cable termination and the coil is within the cast, and wherein a first part of the insulated cable termination extends from the connection point through a portion of the cast to the cast surface, a second part of the insulated cable termination forms a flexible portion of the insulated cable termination which further extends from the cast surface outwards, at least the flexible portion of the insulated cable termination comprises a plurality of metal wires, wherein the insulated cable termination comprises a plurality of sheds provided around the flexible portion of the insulated cable termination for at least a part of a length of the insulated cable termination outwards from the cast surface, and at least one cylindrical insulation screen provided around the insulated cable termination, the cylindrical insulation screen comprising a glass-fibre.

* * * * *